United States Patent Office 2,699,203
Patented Jan. 11, 1955

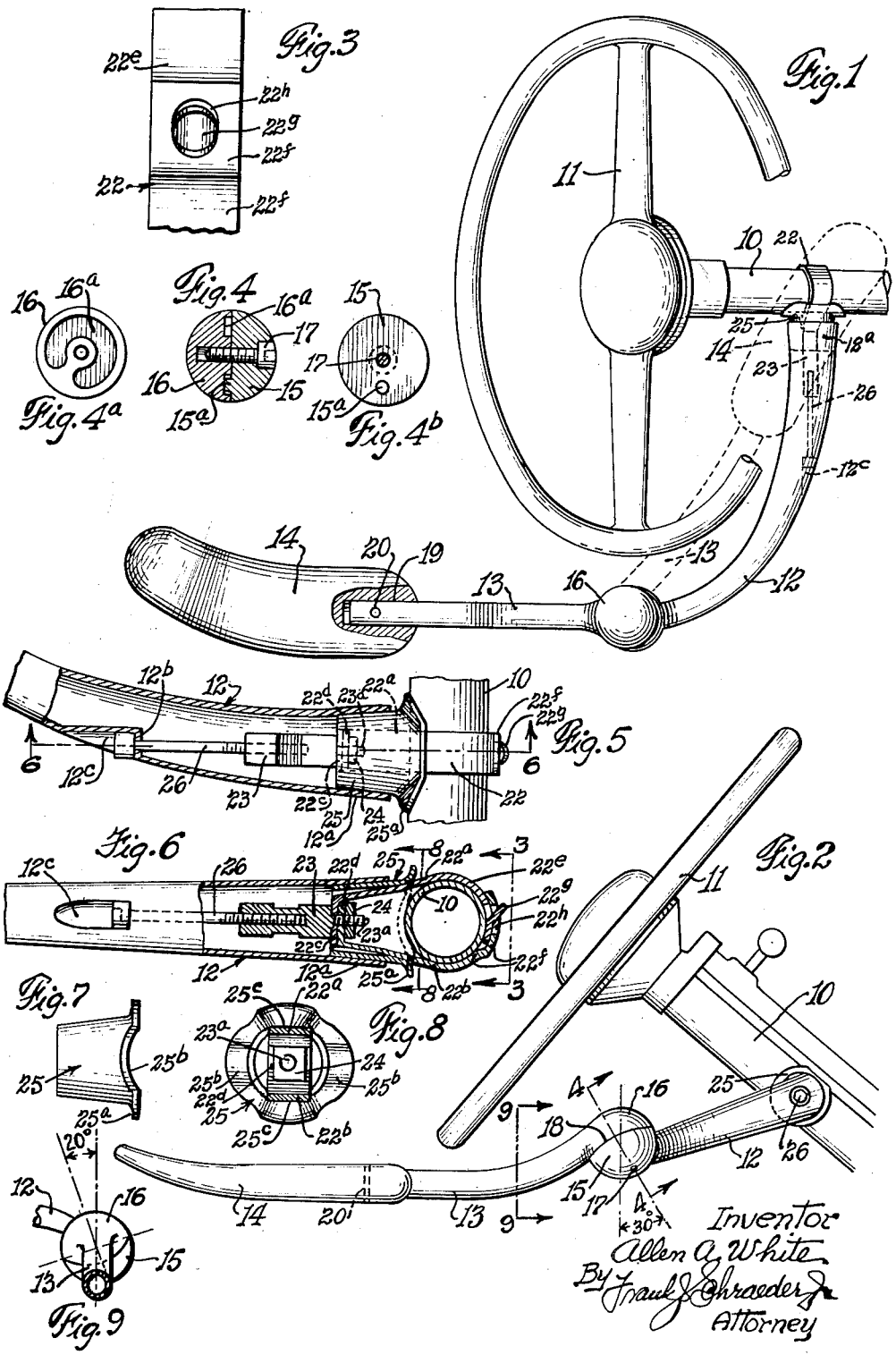

2,699,203
AUTOMOBILE DRIVER'S ARMREST

Allen A. White, Peabody, Kans.

Application June 12, 1953, Serial No. 361,294

7 Claims. (Cl. 155—198)

The present invention generally relates to an attachment for the steering column of an automobile, to provide a rest for a driver's arm.

The main objects of the present invention are to produce a device having unique structural characteristics that allow it to be fastened very rigidly to an automotive vehicle's steering column; that provides more comfortable support to the driver's arm than any prior device of which I am aware; that permits the driver's arm to rest in various positions to relieve the tedium of having it remain in one position too long; that may be adjusted quickly and easily to bring it to the height and angle best suiting the driver; that is so jointed for folding that neither the skin on the user's hands nor wearing apparel can be caught and pinched in the joints; and that provides a rigid hand-hold, which a seat mate will naturally grasp when, in an excited state, he may reach for the steering wheel and create a hazardous condition.

The various features of novelty whereby the present invention is characterized will hereinafter be pointed out with particularity in the claims, but, for a full understanding of the invention and of its objects and advantages, reference may be had to the following detailed description taken in connection with the accompanying drawing, wherein:

Figure 1 is a top plan view of the upper part of an automobile steering column and steering wheel, having attached thereto an arm rest embodying the present invention, unfolded for use in full lines and, folded, in broken lines.

Fig. 2 is a side view of the parts shown in Fig. 1.

Fig. 3 is an enlarged end view of the arm rest steering column clamp taken on line 3—3 of Figure 6.

Fig. 4 is a section of the pivotal joint, on a larger scale, taken on line 4—4 of Fig. 2.

Figs. 4ª and 4ᵇ are views of the two meeting faces in the joint between the two main parts shown in Fig. 4.

Fig. 5 is a view, partly in side elevation and partly in section, showing a fragment of the steering column and a portion of the stationary member of the arm rest attached to the latter.

Fig. 6 is a section taken on line 6—6 of Fig. 5, a portion of the arm being in elevation.

Fig. 7 is a side view of the frusto-conical sleeve which cooperates with a clamp for securing the arm rest to the steering column.

Fig. 8 is a section taken on line 8—8 of Fig. 6.

Fig. 9 is a section taken on line 9—9 of Fig. 2.

Referring to the drawing, 10 represents an automobile steering column and 11 a steering wheel on the upper end of the same. The arm rest constituting the present invention is adapted to be attached to the steering column.

The arm rest proper comprises a curved, more or less L-shaped securing member 12, adapted to be secured at one end to the steering column 10 and hinged at its other end to a swingable-arm-supporting member 13 preferably terminating in a widened saddle portion 14 fixed to the free end of member 13 to more comfortably support the driver's arm. Members 12 and 13 are preferably formed of heavy tubular members terminating at their meeting ends in half spheres 15 and 16, respectively. Hinge pin 17 extends through a diameter of the sphere formed by the two half spheres; the pin 17 being at right angles to the plane of the meeting faces, indicated by the line 18 in Fig. 2. Saddle 14 is preferably a paddle-like elongated part somewhat slightly upwardly curved at its outer free end and may be formed of any suitable material, a fine grained hardwood being satisfactory. In the arrangement shown, the saddle 14 contains in one end a bore 19 in which the free end of member 13 is entered. A pin 20, extending into the saddle and through member 13, holds these two members in fixed relation to each other.

As best shown in Figs. 4, 4ª and 4ᵇ, the joint between arm rest members 12 and 13 limits their relative angular movements to substantially less than 360°. This is accomplished by providing the flat face of one half sphere with a pin or lug 15ª which extends into an arcuate groove 16ª in the other half sphere. The length of this groove determines the extent of relative angular movement permitted between members 12 and 13. Hinge pin 17 is a screw extending freely through part 15 and into screw threaded relation with part 16.

The manner of attaching the device to the steering column is an important factor in making the device a highly desirable part of the equipment of a motor vehicle.

First, there is a U-shaped clamp 22 embracing the steering column, this clamp contacting the column 10 over slightly more than one half its circumference. The legs of the U-shaped clamp are preferably made in separate pieces 22ª and 22ᵇ and are sufficiently long to permit their overlapped inturned inner ends 22ᶜ and 22ᵈ to extend inwardly of the member 12 away from the column whereas their outer arcuate ends 22ᵉ and 22ᶠ overlap and when in overlapping position are interengaged by a finger 22ᵍ struck out from the end of 22ᵉ projecting into an opening 22ʰ in end 22ᶠ. These legs converge slightly from the column to their inner ends. A threaded stud 23ª extends from an elongated connection nut 23 through the over-lapped inner ends 22ᶜ and 22ᵈ and into a nut 24 between the legs 22ª and 22ᵇ of the clamp at their inner overlapped ends.

Surrounding the inwardly converging legs 22ª and 22ᵇ of the clamp is a frusto-conical sleeve 25 which is provided with an external flange 25ª at its large outer end. This flange is deformed, as shown in Figs. 7 and 8, to provide diametrically opposed arcuate seats 25ᵇ, curved to fit the curvature of the steering column. Also, as best shown in Fig. 8, there are two other deformations of the flange forming additional seats 25ᶜ, on a diameter at right angles to that of seats 25ᵇ. Seats 25ᶜ fit the clamp legs and provide an interlock between the clamp 22 and the sleeve 25 to prevent relative rotation.

The outer end of the securing member 12 is slightly flared, as at 12ª, to fit around the frusto-conical sleeve 25. Also, a portion of the convex side of the wall of member 12 is pressed inwardly to create an internal transverse wall section 12ᵇ at one end of an elongated pocket 12ᶜ. A headed long screw 26 extends through wall section 12ᵇ and into an internally screw-threaded inner end of the elongated connection nut 23. As screw 26 is tightened and its head engages wall section 12ᵇ, it exerts a pull tending to draw the clamp legs farther into member 12. Since the clamp 22 is anchored about the steering column, the pivotally connected members 12 and 13 are drawn toward the column 10 until the frusto-conical sleeve 25 engages the column 10 and thus the column 10 is gripped tightly between the overlapped arcuate ends of the clamp and the flanged end 25ª of the sleeve 25. Also, the sleeve seats 25ᶜ are so interlocked with the clamp legs that no relative movement between the sleeve 25 and clamp 22 occurs. Therefore, since the sleeve 25 fits tightly within the end of the arm rest member 12, the the arm rest cannot turn about the axis of the sleeve, and is rigidly secured to the steering column.

Member 12 is preferably tapered from its outer end toward its inner hinged end, and is curved, the curvature being greatest toward the hinge end where a tangent thereto is approximately parallel to a vertical plane containing the axis of the steering column, whereas a tangent at the outer end is at right angles to such plane. Also, the parts are so arranged that the hinge axis between the arm members is at an angle of about 20° to said plane and at an angle of about 30° with respect to a vertical plane at right angles to the aforesaid plane. See Figs. 2 and 9.

The pin and groove connection at the hinge joint is such that the swinging part 13 of the arm rest can turn between the limits illustrated in full lines and broken lines, respectively, in Fig. 1. When in the full line position, the swinging part 13 of the arm rest lies a little below and near the right hand side of the steering column, parallel to the vertical plane containing the axis of the steering column; and it may be approximately horizontal, as shown, or raised or dipped down a little. Upon loosening screw 26, the arm rest may be shifted bodily up or down with the attaching means, along the steering column; and its angle to the horizontal may be varied by turning it on the conical sleeve. This makes it possible to adjust the device into the position best suiting the user.

When the arm rest is not used, the outer part 13 is simply swung into the broken line position of Fig. 1, so as to underlie the front half of the steering wheel. As shown in Fig. 2, arm rest member 13 is curved downward in the vertical direction to lower the saddle end below the hinge joint and yet permit it to swing up over and near to the stationary part 12, in folding.

In the plan view shown in Fig. 1, the saddle 14 is somewhat kidney shaped, the outer end curving over toward the the driver and also upwardly. Furthermore, the top face of the main body of the saddle, inwardly from the upturned end, preferably slopes downward, away from the driver, at an angle of about 7°. This slope and the curvatures have been found to add greatly to the comfort of the user, as it enables him to rest his arm on the device in any one of a variety of natural, easy positions.

In using the arm rest, the driver may grip the ball at the hinge joint, or he may allow his hand to lie outstretched on or grasping some other part of the device, while his forearm is resting on the saddle.

It will be noted that the range of adjustments of the arm rest is almost infinite: it may not only be shifted bodily up and down along the steering column and angularly about the sleeve 25, but it may be turned bodily, angularly of the axis of the column. Adjustments may therefore be made quickly and easily to suit the needs of any driver.

Since the two halves of the sphere at the hinge joint in the device have flat, machined faces engaging each other, there is no gap between them wherein skin or clothing may be pinched.

Since the stationary part 12 is always between the steering wheel and a seat mate of the driver, the seat mate is more apt to grasp this member than the steering wheel should he, in a state of excitement, reach for the latter. To this extent the arm rest is a safety factor against interference with the driver.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. An automobile driver's arm rest comprising two elongated, rigid members hinged together, the first of said members being curved so that the angle between tangents at the ends thereof is about 90°, means to secure the free end of said first member to a steering column, an arm-supporting saddle on the free end of the second of said members, means on said members to connect them together while leaving the second member free to swing from an extended position, in which the second member is approximately parallel to the tangent at the hinge end of the first member, to a folded position in which the second member overlies and is close to the first member, and means on said members to arrest the movement of said second member whenever it reaches either of said positions.

2. An automobile driver's arm rest comprising two elongated rigid members hinged together, the first of said members being curved so that the angle between tangents at the ends thereof is about 90 degrees, means to removably secure the free end of said first member to a steering column, the second member constituting an arm rest, means on said members to connect them loosely for swinging movements of the second member from an extended position thereof in which the second member is approximately parallel to the tangent at the hinge end of the first member, to a folded position in which the second member lies close to the first member with its free end near the steering column, and stops on said members defining the limits of such movements of the second member.

3. An arm rest as set forth in claim 2, wherein the means for connecting said members together comprises similar half spheres having flat faces engaged with each other, and a pin connecting said half spheres to form a sphere, and wherein the stops are on such flat faces.

4. An arm rest as set forth in claim 3, wherein the parts are so proportioned that the hinge pin lies at an acute angle to each of two vertical planes arranged at right angles to each other when the arm rest is installed in a motor vehicle.

5. In combination, an automotive vehicle steering column, an arm rest consisting of two hingedly connected members, a U-shaped clamp having an arcuate portion engaging one side of the column and the legs of the clamp projecting beyond the opposite side of the column into one end of the first of the arm rest members, said clamp legs converging toward each other and having overlapping portions at their free ends, an elongated nut within said first arm rest member having a screwthreaded stud at one end extending through the overlapped end portions of the clamp and having at its opposite end an internally screwthreaded bore, a nut on the end of said stud to secure said overlapped leg portions to said elongated nut, a frusto-conical sleeve loose within one end of said first arm rest member fitted around the projecting leg portions of the clamp and adapted to engage said opposite side of said column, and a screw within said end of said first arm rest member engaging a part of said arm rest member and extending into and in screwthreaded relation with said bore, whereby upon tightening of said screw said arm rest is secured to the steering column.

6. The combination as set forth in claim 5, wherein said sleeve has in the large end thereof diametrically opposed seats fitting against the steering column, and additional seats in which the legs of the clamp are seated.

7. The combination as set forth in claim 5, wherein said first arm rest member that is secured to the steering column is tubular, the part engaged by said securing screw is a small transverse wall in one end of an outwardly opening pocket formed of a section of tubular wall pressed inwardly, and the screw is within and extends lengthwise of said first member.

References Cited in the file of this patent

UNITED STATES PATENTS

| | | |
|---|---|---|
| 1,090,929 | McFaddin | Mar. 24, 1914 |
| 1,251,147 | Wesche | Dec. 25, 1917 |
| 1,737,350 | Balcer | Nov. 26, 1929 |
| 2,491,009 | Lawrence | Dec. 13, 1949 |
| 2,592,702 | Sprung | Apr. 15, 1952 |
| 2,617,619 | Versen | Nov. 11, 1952 |
| 2,661,177 | Hofer | Dec. 1, 1953 |

FOREIGN PATENTS

| | | |
|---|---|---|
| 23,790 | Great Britain | 1912 |